United States Patent
Chuang

(10) Patent No.: US 6,527,420 B1
(45) Date of Patent: Mar. 4, 2003

(54) ILLUMINATING MODULE FOR A DISPLAY APPARATUS

(75) Inventor: Fu-Ming Chuang, Hsin-Chu Hsien (TW)

(73) Assignee: Prokia Technology Co., Ltd., Tainan Hsien (TW)

( * ) Notice: Subject to any disclaimer, the term of this patent is extended or adjusted under 35 U.S.C. 154(b) by 0 days.

(21) Appl. No.: 10/008,718

(22) Filed: Dec. 6, 2001

(51) Int. Cl.[7] .............................. F21V 13/04; F21V 7/09
(52) U.S. Cl. ...................... 362/346; 362/237; 362/297; 362/331; 362/349
(58) Field of Search .................. 362/346, 297, 362/347, 349, 331, 304, 305, 237, 227, 235

(56) References Cited

U.S. PATENT DOCUMENTS 3,586,849 A * 6/1971 Starkweather
4,985,814 A * 1/1991 Lyons ........................ 362/240
5,075,827 A * 12/1991 Smith ......................... 362/221
6,170,962 B1 * 1/2001 Wordin ....................... 362/247
6,193,394 B1 * 2/2001 Herst et al. ................. 362/260

* cited by examiner

*Primary Examiner*—Laura K. Tso
(74) *Attorney, Agent, or Firm*—Trop, Pruner & Hu, P.C.

(57) ABSTRACT

An illuminating module includes two spaced-apart light sources, two hemispherical reflectors, two parabolic reflectors and two planar reflectors. Each of the light sources is disposed at a common focal point of one of the hemispherical reflectors and one of the parabolic reflectors. Each of the parabolic reflectors faces a respective one of the hemispherical reflectors in one direction, and confronts a respective one of the planar reflectors in the other direction such that light rays from each of the light sources which radiate toward the respective hemispherical reflector and the respective parabolic reflector are directed to the respective planar reflector so as to be subsequently reflected to travel in parallel lines parallel to an optical axis.

8 Claims, 3 Drawing Sheets

ILLUMINATING MODULE FOR A DISPLAY APPARATUS

BACKGROUND OF THE INVENTION

1. Field of the Invention

The invention relates to an illuminating module for a display apparatus, more particularly to an illuminating module which employs two light sources and which can achieve a relatively high light utilization rate while ensuring compactness and lightness.

2. Description of the Related Art

Conventional display apparatuses require a light source in order to perform beam splitting, modulation, synthesis, image formation, etc. The utilization of light has a direct effect on the quality of the images produced and the size of the apparatus. In terms of the utilization of light, some display apparatuses use a single light source, while others employ a plurality of light sources. This invention is directed to an illuminating module having two light sources for a display apparatus.

FIG. 1 shows a conventional illuminating module including, from left to right, a reflector assembly 11, two light sources 112, a light integrator 12, a polarization state converter 13 and two condensers 14. The reflector assembly 11 includes two juxtaposed parabolic reflectors 111, each of which has a parabolic reflecting surface 113 facing the light integrator 12. The light sources 112 are respectively disposed at focal points of the parabolic reflectors 11. Light rays radiated by each of the light sources 112 are reflected by the corresponding one of the reflecting surfaces 113 to travel in parallel lines toward the light integrator 12. The light integrator 12 converts the light rays from the reflector assembly 11 into evenly distributed light rays for passage through the polarization state converter 13 and the condensers 14 for subsequent projection on a display panel 15 to display desired images.

In the conventional illuminating module 11, although the two juxtaposed parabolic reflectors 111 can reflect the light rays from the two light sources 112, since the light rays reflected by the reflecting surfaces 113 encompass a relatively large area, the sizes of the light integrator 12, the polarization state converter 13, and the condensers 14 have to be correspondingly enlarged in order to achieve an optimum light utilization rate. In addition, more condensers may need to be used. In other words, to effectively utilize the light rays, the conventional illuminating module 11 requires larger or a great number of components, which means higher costs and increased size.

On the other hand, if a smaller light integrator 12 and a fewer number of condensers 14 are used in conjunction with the two parabolic reflectors 111, the light rays reflected by the reflectors 111, which cover a relatively extensive area, cannot be effectively used. In short, the conventional illuminating module 1 cannot achieve compactness with an optimum light utilization rate.

SUMMARY OF THE INVENTION

Therefore, the main object of the present invention is to provide an illuminating module for a display apparatus, which employs two light sources and which can achieve a relatively high light utilization rate while ensuring compactness and lightness.

Accordingly, an illuminating module of the present invention is adapted for use in a display apparatus, and includes first and second light sources, curved first, second, third and fourth reflectors, and fifth and sixth reflectors. The first and second light sources are spaced apart from each other in a first direction. The first reflector has a hemispherical first reflecting surface facing in a second direction that is transverse to the first direction, and a first focal point that is coincident with the first light source. The curved second reflector has a hemispherical second reflecting surface that faces in a third direction parallel to the second direction and that is spaced apart from the first reflector in the first direction, and a second focal point that is coincident with the second light source. The curved third reflector has a parabolic third reflecting surface that faces and that is spaced apart from the first reflecting surface in the second direction, and a third focal point that is coincident with the first focal point. The first portion of light rays from the first light source radiates toward the third reflecting surface, while a second portion of the light rays from the first light source radiates toward the first reflecting surface and is reflected thereby to combine with the first portion of the light rays. The curved fourth reflector has a parabolic fourth reflecting surface that faces and that is spaced apart from the second reflecting surface in the third direction, and a fourth focal point that is coincident with the second focal point. A first part of light rays from the second light source radiates toward the fourth reflecting surface, while a second part of the light rays from the second light source radiates toward the second reflecting surface and is reflected thereby to combine with the first part of the light rays. The fifth reflector is disposed between the third and fourth reflectors, and has a planar fifth reflecting surface facing the third reflecting surface in a fourth direction that is transverse to the second direction. The light rays received by the third reflecting surface are reflected thereby to travel in the fourth direction toward the fifth reflector, and the light rays received by the fifth reflecting surface are reflected thereby to travel in a fifth direction transverse to the fourth direction and parallel to an optical axis. The sixth reflector is disposed between the third and fourth reflectors, and has a planar sixth reflecting surface facing the fourth reflecting surface in a sixth direction that is transverse to the third direction. The light rays received by the fourth reflecting surface are reflected thereby to travel in the sixth direction toward the sixth reflector, and the light rays received by the sixth reflecting surface are reflected thereby to travel in a seventh direction transverse to the sixth direction and parallel to the optical axis.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
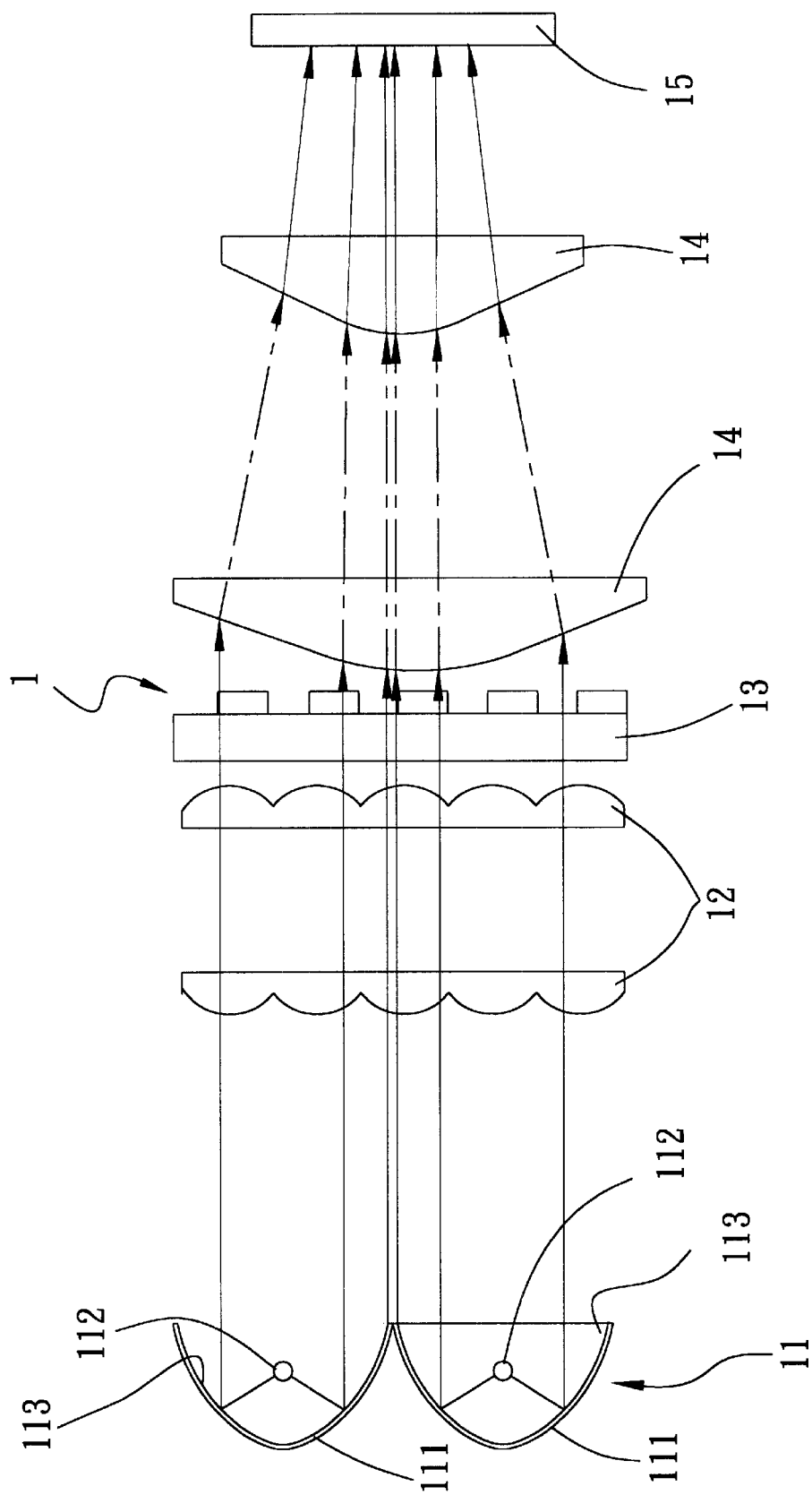
FIG. 1 is a schematic view of a conventional illuminating module for a display apparatus.

Before the present invention is described in greater detail, it should be noted that like elements are denoted by the same reference numerals throughout the disclosure.

Figure 2:
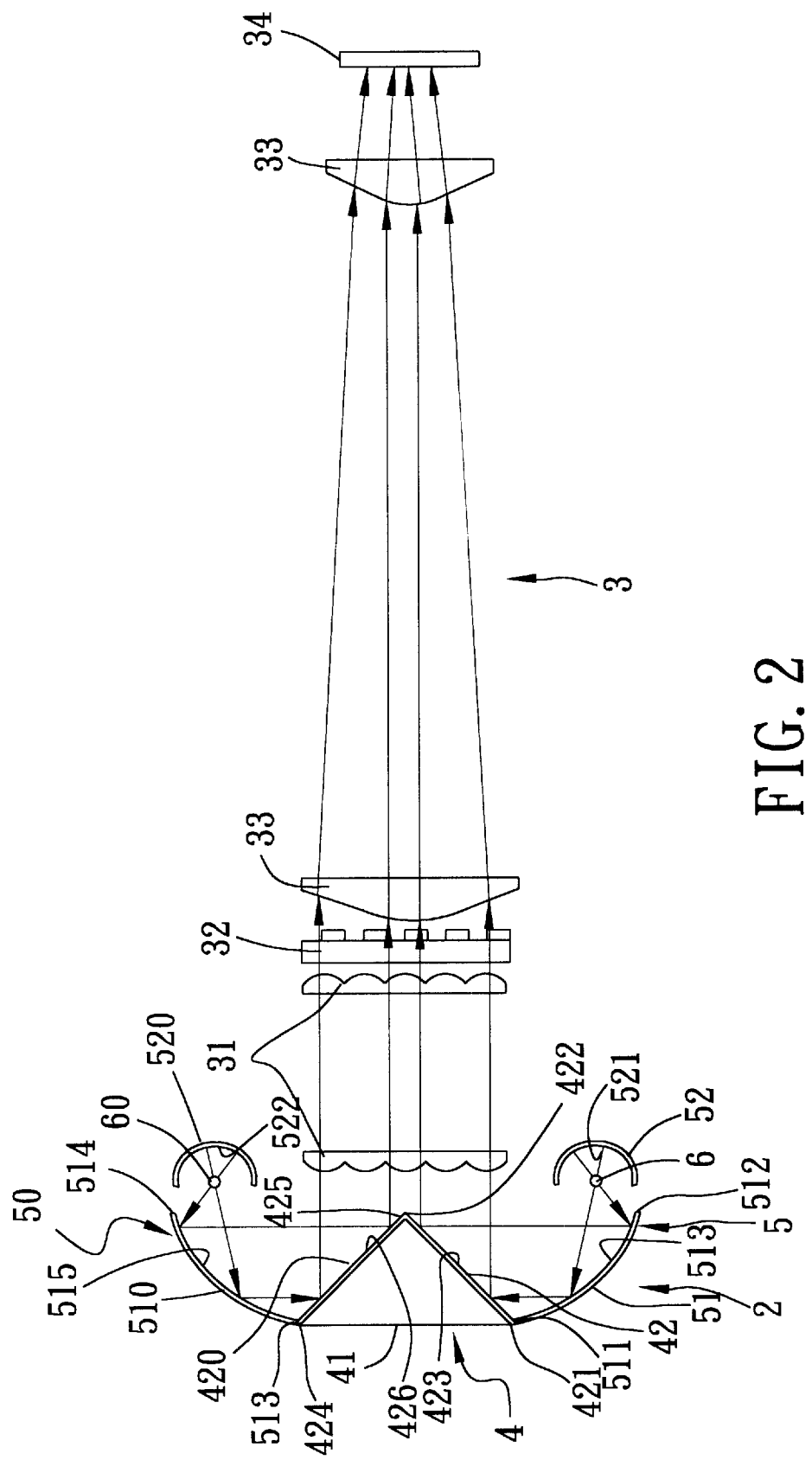
FIG. 2 is a schematic view of the first preferred embodiment of an illuminating module for a display apparatus according to the invention.

Referring to FIG. 2, the preferred embodiment of an illuminating module 2 according to the present invention forms a part of a display apparatus, and is shown to include first and second light sources 6, 60, curved first and second reflectors 52, 520, curved third and fourth reflectors 51, 510, and fifth and sixth reflectors 42, 420.

The first and second light sources 6, 60 are spaced apart from each other in a first direction, and are both in the form of an arc lamp, such as a high-voltage mercury lamp, a xenon arc lamp, etc., that serves as a point-light source.

The first reflector 52 has a hemispherical first reflecting surface 521 facing in a second direction that is transverse to the first direction, and a first focal point that is coincident with the first light source 6.

The second reflector 520 has a hemispherical second reflecting surface 522 that faces in a third direction parallel to the second direction and that is spaced apart from the first reflector 52 in the first direction, and a second focal point that is coincident with the second light source 60.

The third reflector 51 has a parabolic third reflecting surface 515 that faces and that is spaced apart from the first reflecting surface 521 in the second direction, and a third focal point that is coincident with the first focal point. In addition, the third reflector 51 has proximate and distal ends 512, 511 relative to the first light source 6. A first portion of light rays from the first light source 6 radiates toward the third reflecting surface 513, while a second portion of the light rays from the first light source 6 radiates toward the first reflecting surface 521 and is reflected thereby to combine with the first portion of the light rays. The first and third reflectors 52, 51 together constitute a reflector assembly 5.

The fourth reflector 510 has a parabolic fourth reflecting surface 515 that faces and that is spaced apart from the second reflecting surface 522 in the third direction, and a fourth focal point that is coincident with the second focal point. In addition, the fourth reflector 510 has proximate and distal ends 514, 513 relative to the second light source 60. A first part of light rays from the second light source 60 radiates toward the fourth reflecting surface 515, while a second part of the light rays from the second light source 60 radiates toward the second reflecting surface 522 and is reflected thereby to combine with the first part of the light rays. The second and fourth reflectors 520, 510 together constitute a reflector assembly 50.

The fifth reflector 42 is disposed between the third and fourth reflectors 51, 510, and has a planar fifth reflecting surface 423 facing the third reflecting surface 513 in a fourth direction that is transverse to the second direction. The light rays received by the third reflecting surface 513 are reflected thereby to travel in the fourth direction toward the fifth reflector 42, and the light rays received by the fifth reflecting surface 423 are reflected thereby to travel in a fifth direction transverse to the fourth direction and parallel to an optical axis.

The sixth reflector 420 is disposed between the third and fourth reflectors 51, 510, and has a planar sixth reflecting surface 426 facing the fourth reflecting surface 515 in a sixth direction that is transverse to the third direction. The light rays received by the fourth reflecting surface 515 are reflected thereby to travel in the sixth direction toward the sixth reflector 420, and the light rays received by the sixth reflecting surface 426 are reflected thereby to travel in a seventh direction transverse to the sixth direction and parallel to the optical axis.

In this embodiment, the fifth and sixth reflectors 42, 420 constitute two sides of a synthesizing prism 4 having a base 41 that extends in a direction parallel to the first direction. In terms of design, the fifth and sixth reflectors 42, 420 can be formed as lenses having reflecting surfaces to reflect the light rays for propagation in parallel lines. The fifth reflector 42 has proximate and distal ends 422, 421 relative to the first and second light sources 6, 60. The sixth reflector 420 has proximate and distal ends 425, 424 relative to the first and second light sources 6, 60. The proximate ends 422, 425 of the fifth and sixth reflectors 42,420 are connected to each other, and are spaced apart from a plane passing through the first and second light sources 6, 60 by a first distance. The proximate ends 512, 514 of the third and fourth reflectors 51, 510 are spaced apart from the plane by a second distance not longer than the first distance. Furthermore, the distal end 511, 513 of each of the third and fourth reflectors 51, 510 is disposed in close proximity with the distal end 421, 424 of an adjacent one of the fifth and sixth reflectors 42, 420.

The preferred embodiment of the illuminating module 2 further includes a light processing unit 3 comprising a light integrator 31 in the form of a lens array integrator disposed on the optical axis so as to receive the light rays from the fifth and sixth reflecting surfaces 423, 426, a polarization state converter 32 disposed on the optical axis so as to receive the light rays passing through the light integrator 31, and a condenser including two condenser lenses 33 disposed on the optical axis so as to receive the light rays passing through the polarization state converter 32.

In use, the light rays from the first light source 6 radiate toward both the first and third reflecting surfaces 521, 513. As the first light source 6 is located at the first and third focal points, the light rays that fall on the first reflecting surface 521 are reflected to combine with those that radiate toward the third reflecting surface 513. The light rays that radiate toward the third reflecting surface 513 are directly reflected thereby to travel in parallel lines toward the fifth reflecting surface 423, and are subsequently reflected by the fifth reflecting surface 423 to travel in parallel lines toward the light integrator 31 for light integration. In a like manner, the light rays emitted from the second light source 60 radiate toward both the second and fourth reflecting surfaces 522, 515. The light rays that fall on the second reflecting surface 522 are reflected to combine with those that radiate toward the fourth reflecting surface 515. The light rays that radiate toward the fourth reflecting surface 515 are reflected thereby to travel in parallel lines toward the sixth reflecting surface 426, and are subsequently reflected by the sixth reflecting surface 426 to travel in parallel lines toward the light integrator 31. The light integrator 31 integrates the light rays from the fifth and sixth reflecting surfaces 423, 426 for subsequent passage through the polarization state converter 32 and the condenser lenses 33 and projection onto a display panel 34.

In sum, the preferred embodiment employs two light sources 6, 60 and two reflector assemblies 5, 50 to direct the light rays from the light sources 6, 60 to the fifth and sixth reflecting surfaces 423, 426 of the synthesizing prism 4. Due to the configuration of the fifth and sixth reflectors 42, 420 of the synthesizing prism 4, the light rays reflected by the fifth and sixth reflecting surfaces 423, 426 cover a relatively small area, thereby achieving a higher light utilization rate while ensuring compactness and lightness.

Figure 3:
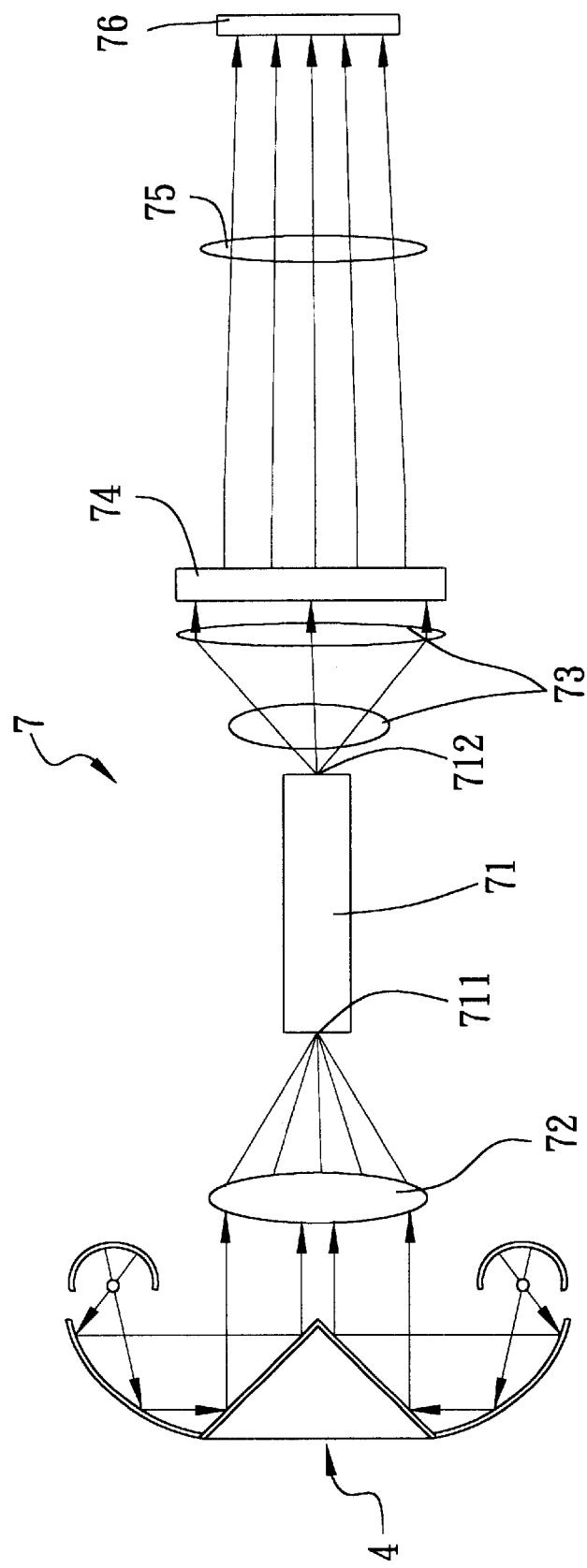
FIG. 3 is a schematic view of the second preferred embodiment of an illuminating module for a display apparatus according to the invention.

Reference is made to FIG. 3, which shows the second preferred embodiment of an illuminating module according to the present invention. The difference between this embodiment and the previous embodiment resides in that a light processing unit 7 includes a light integrator 71 in the form of a rod integrator for receiving light rays from the synthesizing prism 4 and having an input side 711, a positive lens 72, a lens unit 73, a polarization state converter 74 and a condenser 75. The positive lens 72 is disposed between the synthesizing prism 4 and the light integrator 71 for converging the light rays from the synthesizing prism 4 at the input side 711. The lens unit 73 is disposed to direct the light rays that radiate from an output side 712 of the light integrator 71 for passage in turn through the polarization state converter 74 and the condenser 75 to be projected subsequently onto a display panel 76.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An illuminating module for a display apparatus, said illuminating module comprising:

first and second light sources that are spaced apart from each other in a first direction;

a curved first reflector having a hemispherical first reflecting surface facing in a second direction that is transverse to the first direction, and a first focal point that is coincident with said first light source;

a curved second reflector having a hemispherical second reflecting surface that faces in a third direction parallel to the second direction and that is spaced apart from said first reflector in the first direction, and a second focal point that is coincident with said second light source;

a curved third reflector having a parabolic third reflecting surface that faces and that is spaced apart from said first reflecting surface in the second direction, and a third focal point that is coincident with said first focal point, wherein a first portion of light rays from said first light source radiates toward said third reflecting surface, while a second portion of the light rays from said first light source radiates toward said first reflecting surface and is reflected thereby to combine with the first portion of the light rays;

a curved fourth reflector having a parabolic fourth reflecting surface that faces and that is spaced apart from said second reflecting surface in the third direction, and a fourth focal point that is coincident with said second focal point, wherein a first part of light rays from said second light source radiates toward said fourth reflecting surface, while a second part of the light rays from said second light source radiates toward said second reflecting surface and is reflected thereby to combine with the first part of the light rays;

a fifth reflector disposed between said third and fourth reflectors and having a planar fifth reflecting surface facing said third reflecting surface in a fourth direction that is transverse to the second direction, wherein the light rays received by said third reflecting surface are reflected thereby to travel in the fourth direction toward said fifth reflector, and the light rays received by said fifth reflecting surface are reflected thereby to travel in a fifth direction transverse to the fourth direction and parallel to an optical axis; and a sixth reflector disposed between said third and fourth reflectors and having a planar sixth reflecting surface facing said fourth reflecting surface in a sixth direction that is transverse to the third direction, wherein the light rays received by said fourth reflecting surface are reflected thereby to travel in the sixth direction toward said sixth reflector, and the light rays received by said sixth reflecting surface are reflected thereby to travel in a seventh direction transverse to the sixth direction and parallel to the optical axis.

2. The illuminating module of claim 1, wherein said fifth and sixth reflectors constitute two sides of a synthesizing prism.

3. The illuminating module of claim 1, wherein each of said third, fourth, fifth and sixth reflectors has a proximate end and a distal end relative to said first and second light sources, said distal end of each of said third and fourth reflectors being disposed in close proximity with said distal end of an adjacent one of said fifth and sixth reflectors, said proximate ends of said fifth and sixth reflectors being connected to each other and being spaced apart from a plane passing through said first and second light sources by a first distance, said proximate ends of said third and fourth reflectors being spaced apart from the plane by a second distance not longer than the first distance.

4. The illuminating module of claim 1, further comprising:

a light integrator disposed on said optical axis so as to receive the light rays from said fifth and sixth reflecting surfaces;

a polarization state converter disposed on said optical axis so as to receive the light rays passing through said light integrator; and a condenser disposed on said optical axis so as to receive the light rays passing through said polarization state converter.

5. The illuminating module of claim 4, wherein said light integrator is a lens array integrator.

6. The illuminating module of claim 4, wherein said light integrator is a rod integrator.

7. The illuminating module of claim 6, further comprising a positive lens disposed on said optical axis between fifth and sixth reflecting surfaces and said light integrator.

8. The illuminating module of claim 6, further comprising a lens unit disposed on said optical axis between said light integrator and said polarization state converter.

* * * * *